(12) United States Patent
Beachem et al.

(10) Patent No.: US 8,588,422 B2
(45) Date of Patent: Nov. 19, 2013

(54) KEY MANAGEMENT TO PROTECT ENCRYPTED DATA OF AN ENDPOINT COMPUTING DEVICE

(75) Inventors: Brent R. Beachem, Riverton, UT (US); Merrill K. Smith, Riverton, UT (US)

(73) Assignee: Novell, Inc., Provo, UT (US)

( * ) Notice: Subject to any disclaimer, the term of this patent is extended or adjusted under 35 U.S.C. 154(b) by 778 days.

(21) Appl. No.: 12/473,480

(22) Filed: May 28, 2009

(65) Prior Publication Data
US 2010/0303240 A1 Dec. 2, 2010

(51) Int. Cl.
*H04L 29/06* (2006.01)

(52) U.S. Cl.
USPC .......................................................... 380/277

(58) Field of Classification Search
USPC .......................................................... 380/277
See application file for complete search history.

(56) References Cited

U.S. PATENT DOCUMENTS

| | | | |
|---|---|---|---|
| 6,327,660 B1 | 12/2001 | Patel | |
| 6,996,706 B1 | 2/2006 | Madden et al. | |
| 7,165,170 B2 | 1/2007 | Rothman et al. | |
| 7,206,931 B2 | 4/2007 | Zimmer et al. | |
| 7,237,102 B2 | 6/2007 | Rothman | |
| 7,243,224 B2 | 7/2007 | Nair et al. | |
| 7,257,704 B2 | 8/2007 | O'Neal | |
| 7,320,052 B2 | 1/2008 | Zimmer et al. | |
| 7,412,595 B2 | 8/2008 | Velhal et al. | |
| 7,448,030 B2 | 11/2008 | Lin et al. | |
| 2002/0171546 A1 | 11/2002 | Evans et al. | |
| 2005/0129244 A1* | 6/2005 | Catherman et al. | 380/277 |
| 2005/0166213 A1 | 7/2005 | Cromer et al. | |
| 2005/0273841 A1* | 12/2005 | Freund | 726/1 |
| 2006/0143714 A1* | 6/2006 | Peterson et al. | 726/26 |
| 2006/0161784 A1 | 7/2006 | Hunter et al. | |
| 2006/0161790 A1 | 7/2006 | Hunter et al. | |
| 2007/0198819 A1 | 8/2007 | Dickens et al. | |

(Continued)

FOREIGN PATENT DOCUMENTS

| | | |
|---|---|---|
| EP | 1 895 442 A2 | 3/2008 |
| EP | 1 970 829 A1 | 9/2008 |

(Continued)

OTHER PUBLICATIONS

European Search Report, Application No. EP 10 16 1224, Mailed Aug. 27, 2010.

(Continued)

*Primary Examiner* — Michael S McNally
(74) *Attorney, Agent, or Firm* — King & Schickli, PLLC (57) ABSTRACT

Methods and apparatus involve protecting encrypted data of endpoint computing assets by managing decryption keys. The endpoint has both a traditional operating system for applications, and the like, and another operating system during a pre-boot phase of operation. During use, the pre-boot operating system prevents users of the endpoint from accessing the encrypted data and the key. Upon determining the encrypted data has been compromised, the key is disassociated from the encrypted data. Disassociation can occur in a variety of ways including deleting or scrambling the key and/or data or re-encrypting the encrypted data with a new key. Key escrowing and updating through the pre-boot is further contemplated. The pre-boot phase also contemplates a limited computing connection between the endpoint and a specified authentication server and approved networking ports, USB devices and biometric equipment. Security policies and enforcement modules are also disclosed as are computer program products, computing arrangements, etc.

20 Claims, 5 Drawing Sheets

(56) References Cited

U.S. PATENT DOCUMENTS

| | | | |
|---|---|---|---|
| 2007/0266120 A1 | 11/2007 | Tallieu et al. | |
| 2007/0294520 A1 | 12/2007 | Leigh et al. | |
| 2008/0147830 A1 | 6/2008 | Ridgill et al. | |
| 2008/0226080 A1* | 9/2008 | Li | 380/277 |
| 2009/0172377 A1* | 7/2009 | Gueron et al. | 713/2 |
| 2009/0175444 A1* | 7/2009 | Douglis et al. | 380/45 |
| 2010/0037296 A1* | 2/2010 | Silverstone | 726/3 |
| 2010/0169669 A1* | 7/2010 | Smith | 713/193 |
| 2010/0266132 A1* | 10/2010 | Bablani et al. | 380/286 |

FOREIGN PATENT DOCUMENTS

| | | |
|---|---|---|
| GB | 2 453 230 | 4/2009 |
| WO | WO 03/067435 A2 | 8/2003 |
| WO | WO 03/090053 A1 | 10/2003 |
| WO | WO 2007/111660 A2 | 10/2007 |

OTHER PUBLICATIONS

Preboot Execution Environment (PXE) Specification, Version 2.1, Sep. 20, 1999, Intel Corporation, 103 pages.

Intel vPro Technology for Notebook and Desktop PCs, (undated), Intel Corporation, http://www.intel.com/technology/vpro/index.htm, 2 pages.

Preboot Execution Environment, Updated Aug. 14, 2008, Wikipedia, http://en.wikipedia.org/wiki/Preboot_Execution_Environment, 5 pages.

http://en.wikipedia.org/wiki/Full_Disk_Encryption; "Full disk encryption"; Last modified May 2, 2009; 5 Pages.

http://en.wikipedia.org/wiki/Trusted_Platform_Module; "Trusted Platform Module"; Last modified May 6, 2009; 4 Pages.

http://en.wikipedia.org/wiki/File:TPM_english.svg; File:TPM english.svg; Printed May 20, 2009; 3 Pages.

http://en.wikipedia.org/wiki/Intel_vPro; "Intel vPro"; last modified Apr. 12, 2009; 8 Pages.

* cited by examiner

KEY MANAGEMENT TO PROTECT ENCRYPTED DATA OF AN ENDPOINT COMPUTING DEVICE

FIELD OF THE INVENTION

Generally, the present invention relates to computing devices and computing environments involving endpoint assets, such as laptops, PDAs, phones, etc. for an enterprise or other entity. Particularly, although not exclusively, it relates to managing the keys that encrypt/decrypt data of the endpoint. The invention also relates to the field of computing tasks in a mobile computing environment as assets move between locations during use. Other features contemplate computing arrangements, computing architecture and computer program products, to name a few.

BACKGROUND OF THE INVENTION

Corporate computing assets, such as laptops, phones, PDAs, etc., are utilized outside corporate firewalls today more than before. With ever more employees either working from home or "on the road," controlling and managing corporate information technology (IT) assets is becoming a difficult or serious problem. It is especially complicated when assets are lost or stolen which can compromise corporate data stored on the device.

While full disk encryption (FDE) is but one technique to combat the loss of data on a lost or stolen device, some users and corporations would rather have the data destroyed immediately upon detection instead of relying solely on encryption techniques. In other emerging technologies, data destruction has been developed but the means for accomplishing this are associated with remote hardware diagnosis and troubleshooting unrelated to security actions.

In other technologies, select options are offered that are tied to one type of implementation, such as Trusted Platform Modules (TPM) storing keys, Smart Card/USB device certificate and authentication validation, as well as standard "two factor" authentication. However, these are limited to one implementation only and are not centrally controlled and/or rigidly enforced by policy. In two factor authentication, useful to help remotely debug troublesome endpoints, reliance is placed upon either network communication (layer 2 (MAC) or layer 3 (IP)) to the endpoint, 802.1X authentication and information exchange, or some type of "pre-boot" Operating System (PBOS). These means, however, have not been associated with options for ultimately deleting the data in its entirety or rendering it inaccessible. With the advent of virtual computing devices, such problems are only exacerbated since a single hardware platform will often guest many virtual computing devices, each with its own operating system (potentially vastly different from one another), drivers, interfaces, applications, etc., and its own corporate data.

Accordingly, a need exists in the art of protecting encrypted data of endpoint computing assets for ensured destruction or inaccessibility. Also, such need extends to better managing the keys used to decrypt the data. Even more, the need should extend to virtual environments, each with many domains per a single hardware platform, to mobile environments as assets move about during use, and to leveraging existing technologies. Naturally, any improvements should further contemplate good engineering practices, such as ease of implementation, unobtrusiveness, stability, etc.

SUMMARY OF THE INVENTION

The foregoing and other problems become solved by applying the principles and teachings associated with the hereinafter-described methods and apparatus. At a high level, embodiments involve protecting encrypted data of endpoint computing assets (e.g., laptop, PDA, phone, etc.) by managing decryption keys. The endpoint has both a traditional operating system for loading and utilizing computing applications, as is typical, and another operating system during a pre-boot phase of operation.

During use, the pre-boot operating system prevents users of the endpoint from accessing the encrypted data and the key. Upon a determination that the encrypted data has been compromised, the key is disassociated from the encrypted data. Disassociation can occur in a variety of ways including deleting or scrambling the key and/or data. Updating of keys can also occur as can re-encrypting the encrypted data with a new key. Re-associating otherwise disassociated keys and data may occur upon finding a mistake or lack of compromise in the encrypted data. The pre-boot phase also contemplates a limited computing connection between the endpoint and a specified authentication server and approved networking ports, USB devices and biometric equipment. Security policies and enforcement modules are also disclosed.

In certain hardware embodiments, a platform of the computing device includes a processor(s), memory (RAM, ROM, etc.) and available remote or local storage. Encrypted data and a key to decrypt the data are both stored on the platform, as is a policy enforcement module to carry out predefined security policies defining the relationship between the key and data. Both the computing operating system and a pre-boot operating system are configured on the processor and during a pre-boot phase of operation, the policy enforcement module requires the pre-boot operating system to prevent a user of the endpoint from accessing the encrypted data and the key. It is during this phase that the module further requires the disassociation of the key from the encrypted data whenever the encrypted data has been compromised. The key may be stored in a trusted platform module, flash memory, support memory for crypto-ASICs, etc. This is especially convenient when the encrypted data is configured in full disk encryption (FDE) format, which is a known computing paradigm with TPM. Alternatively, however, the encrypted data may be simply found in files as can the key. Also, the hardware platform can be configured to carry multiple computing domains in a virtual environment. As such, each domain or select domains can also have a dedicated or common pre-boot operating system for undertaking the foregoing.

Ultimately, security policies are enforced on corporate hardware assets independent or as a function of the physical location of the hardware. Evaluation for data compromise also occurs securely since the pre-boot phase of operation only undertakes enough processing capabilities and network interaction to accomplish it. An example scenario used throughout this document involves a notebook or laptop computer having been stolen. The Pre-Boot operating system (PBOS) is setup to require some type of network authentication back to a central server prior to the hard drive becoming accessible. Optionally, the hard drive itself (if hardware based disk encryption was enabled) could require a similar action.

In either case, a new information protocol is used to notify the PBOS (or hardware based disk encryption interface) that the device had been stolen. In turn, the key stored in the TPM (or disk encryption interface) could be destroyed entirely or controlled such that encrypted data is not inappropriately divulged. In both, this solves scenarios where brute force password attacks and other authentication attacks used to exact the key are used. It also resolves more sophisticated attacks where memory "walkers" iterate through device memory to try and extract the key. Additionally, if IT administrators desire to escrow (update, backup, restore, etc) either the TPM key or the key embedded in the internal hard drives crypto-ASIC, this provides remote management means and/or greater than two (>2) factor authentication available with standard networking authentication protocols.

Computing policies themselves may be set and carried directly on the endpoint asset or provided from an upstream, host, or both, or elsewhere. Also, updates to the policy can occur over time. As such, the pre-boot operating system might realtime or over time communicate with the upstream host to ascertain whether an existing computing policy is current and/or whether further information is necessary in order to effectuate evaluation of compromise of encrypted data.

Executable instructions loaded on one or more computing devices for undertaking the foregoing are also contemplated as are computer program products available as a download or on a computer readable medium. The computer program products are also available for installation on a network appliance or individual computing devices.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for protecting encrypted data of endpoint computing assets, especially by way of managing keys that decrypt the data including the use of a secure, pre-boot operating system.

As used herein, the "pre-boot" is a phase of operation commonly referred to as the initialization and configuration by the Basic Input Output System (BIOS). Its time is generally defined by firmware that runs between a processor reset (oftentimes occurring at Power On or during a Restart) and the first instruction of the loader for the traditional Operating System (OS). Thereafter, the start of the OS load begins the period commonly referred to as OS runtime. During OS runtime, the firmware acts as an interface between software and hardware components of a computer system. As computer systems have become more sophisticated, the operational environment between the OS level and the hardware level is generally referred to as the firmware or the firmware environment.

Figure 1:
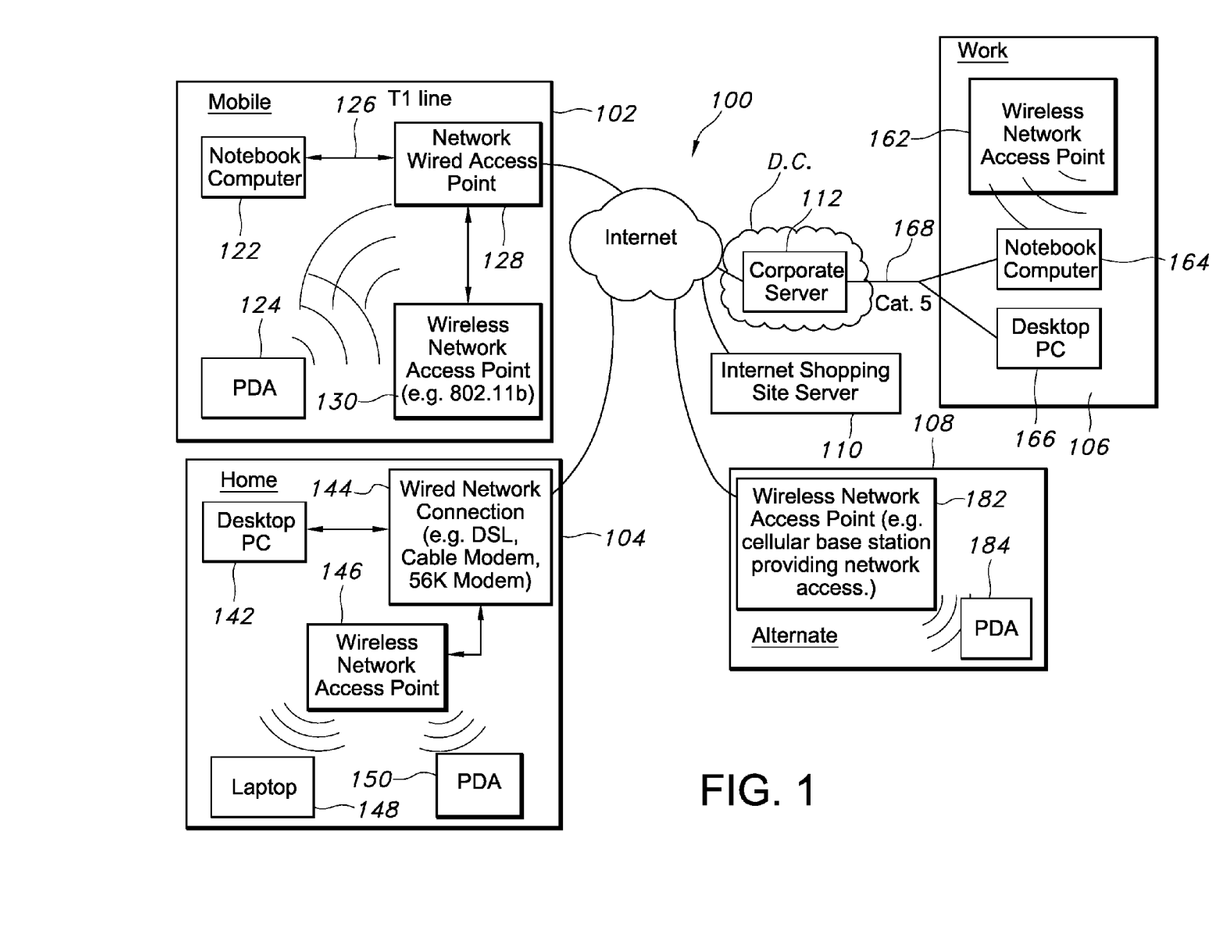
FIG. 1 is a diagrammatic view in accordance with the present invention of a representative computing environment in which an endpoint computing device may operate.

With reference to FIG. 1, a representative computing environment in which an endpoint asset or computing device will operate, and have its encrypted data protected, is given generally as 100. In a variety of "categories," one or more locations 102, 104, 106, 108 are available in which the endpoint may operate in the environment. Also, the asset represents a range of electronic systems (either wired or wireless) including, for example, general or special computers, desktops or laptops, phones, personal digital assistants (PDAs), audio players, or any other electronic device sophisticated enough to have an operating system and able to communicate with other electronic devices.

In a first location category, "Home" 104 is an example of a user's house, apartment, etc. whereby user's fairly often conduct work with an asset of their employer. In this category, each of endpoint computing devices 148 and 150 communicate wirelessly via a wireless network access point (NAP) 146, in turn connected to a larger network at 144. Alternatively, an endpoint computing device in the form of a desktop 142 communicates via a network connection at 144 that is directly wired.

In a second category, the location "Work" 106 is an example of a network environment maintained by a user's employer, such as a corporation or other enterprise. In the illustration, endpoints in the form of notebook and desktop computers 164, 166 have a wired CAT-5 Ethernet connection 168 to a corporate server 112, in turn, connected to other networks such as the Internet. Alternatively, the notebook computer 164 may also communicate with the server 112 through a wireless NAP 162 as illustrated. In either, skilled artisans generally associate these devices with being behind an enterprise firewall, and other appliances will likely exist as part of a larger data center (DC) environment.

In a third category, the location "Mobile" 102 represents environments such as those found at airports, hotels, restaurants, or the like, or even trains, airplanes, cruise ships, cars, etc. As such, an endpoint device, such as the illustrated notebook computer 122, might access a wired NAP 128 through a Tx line 126 and gain access to an Internet shopping site server 110 because the user desires to browse the site while awaiting an airline departure. On the other hand, the notebook computer 122 and PDA 124 might wirelessly connect to a wireless NAP 130, in this example an 802.11b connection, through which they communicate at the airport, for instance.

In a last category, an "Alternate" location is given as 108. In this environment, it is contemplate that a dedicated infrastructure might exist, such as a university campus, in which the endpoint is operating, but otherwise has no affiliation. Similarly, a "Custom" or another named location may be defined. As seen, the wireless NAP 182 in this location is associated with a cellular base station providing network access through a General Packet Radio Services (GPRS) system, Global System for Mobile communication (GSM) system, third generation wireless 3G system or other kind of mobile wireless communication system.

Additionally, as discussed below, each location may have a predetermined computing policy that defines how and to what extent an endpoint computing asset may operate, such as by communicating with other devices, transferring data, surfing the Internet, undertaking downloads, patching applications, etc. In turn, the evaluation of the endpoint asset may vary from location to location. Optionally, it is even relevant that the computing policy take into account the actual connection type of the endpoint asset, such as wired or wireless, and/or the specifics thereof, e.g., T1 line, 802.11, VPN, firewall setting, hardware vendor, etc. Of course, a "default" policy could be further introduced that sets a minimum or maximum threshold of security, for example, or that exists in situations when the actual location of the endpoint device cannot be ascertained or guaranteed to a policy's satisfaction, or for any other reason.

Figure 2A:
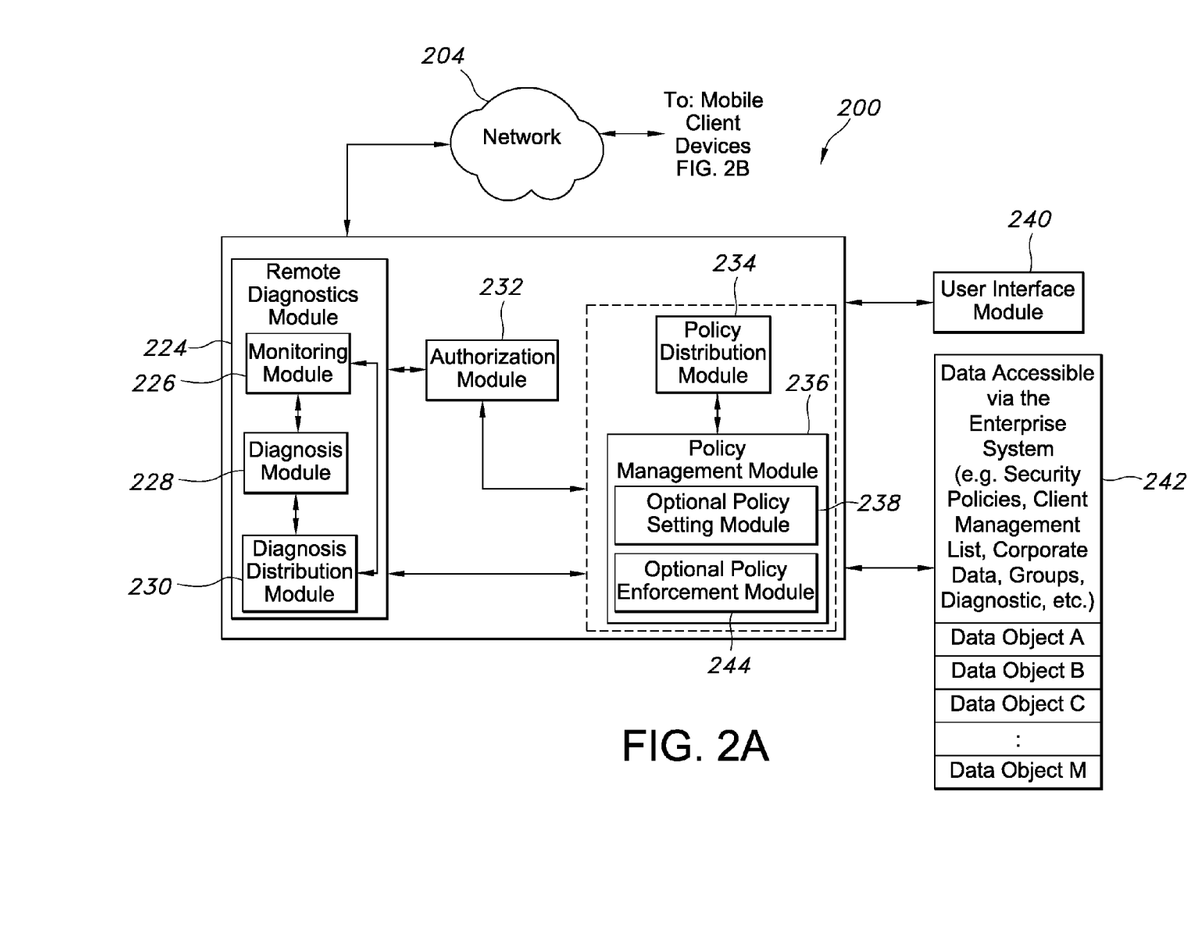
FIGS. 2A and 2B are diagrammatic views in accordance with the present invention of opposite ends of the representative computing environment illustrating computing devices as a host and client.
Figure 2B:
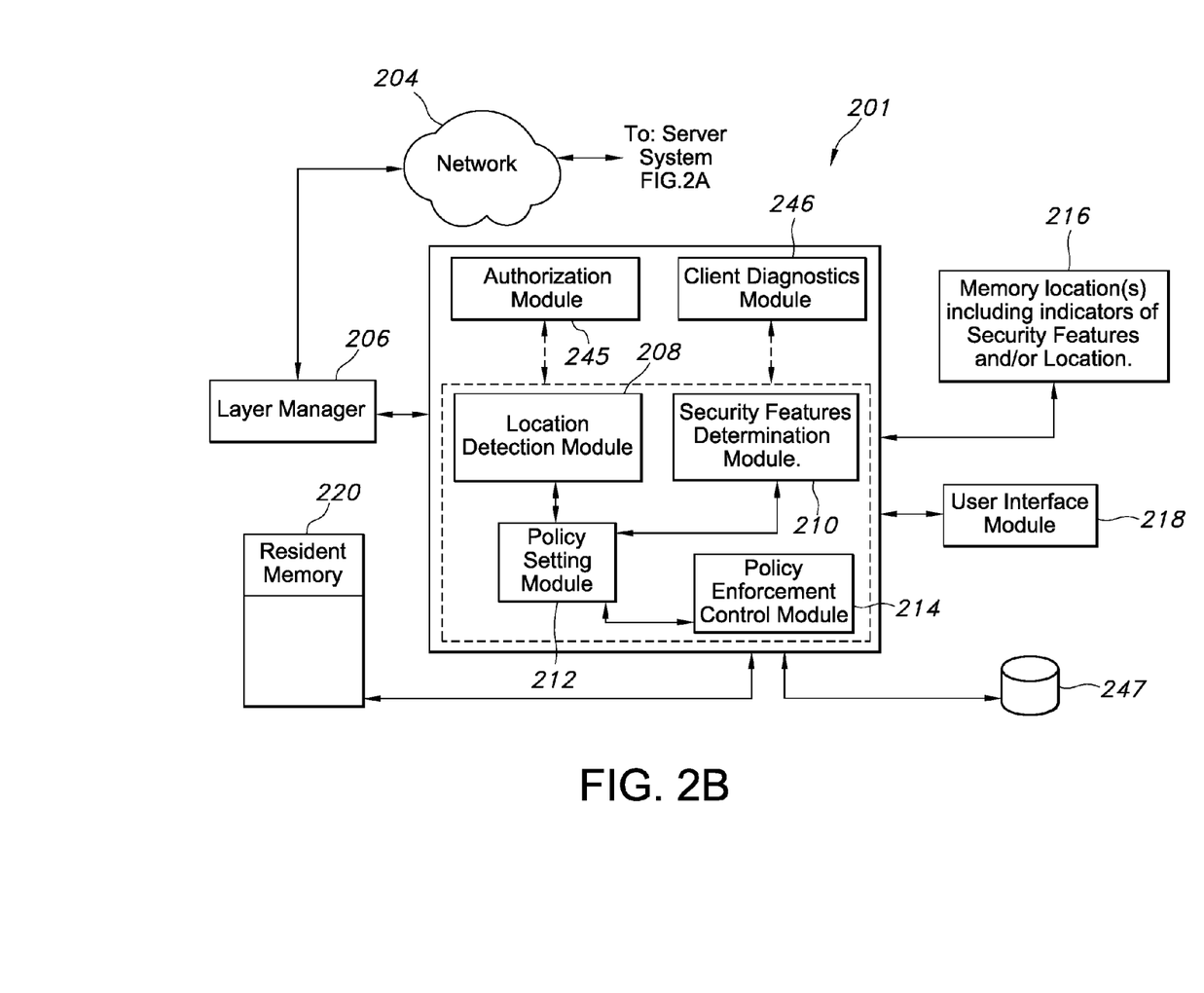

With reference to FIGS. 2A and 2B, a representative illustration of the computing environment of FIG. 1 is used for a computer system 200 (FIG. 2A) acting in a host, server role with respect to an endpoint asset in the form of a mobile, laptop 201 (FIG. 2B) acting in a client role. Similarly, FIGS. 2A and 2B also illustrate interaction between the server computer system 200 and the client 201 for the purpose of protecting encrypted data of the endpoint, especially by way of a pre-boot, secure operating system.

In this regard, the system 200 may be implemented as software executing in a standalone computer having a processor being accessible to memory, the processor being communicatively coupled with one or more network interfaces, a display and input/output devices such as a keyboard and a pointing device. Similarly, the system 200 may be implemented by a series of networked computers as may be typically implemented by an enterprise. Additionally, the system 200 in FIG. 2A may also be implemented in another mobile computing device. As is typical, the server or server-side system 200 allows an administrator to manage and distribute policies and software upgrades, analyze logs, and perform remote diagnostics. Similarly, the client system 201 in FIG. 2B may be implemented as software executing in a mobile computing device having a processor being accessible to memory, the processor being communicatively coupled with one or more network interfaces, a display and input/output devices such as a keyboard and a pointing device. The client side system 201 also monitors the user's changes in location and/or security features and applies the appropriate policies automatically as the user moves about or as different security features are activated or deactivated. The client 201 enforces the policies set up by the administrator, and performs diagnostics. The client 201 can also create and manage policies for the client mobile device when run in a self-managed mode.

In more detail, FIG. 2A illustrates a system 200 having an authorization module 232, a policy distribution module 234, a policy management module 236, illustrated here with an optional policy setting module 238 and an optional policy enforcement module 244, a remote diagnostics module 224 and a user interface module 240.

The policy management module 236 manages security policies. One aspect of managing security policies is defining the policies. In this example, the policy management module 236 comprises instructions for establishing a pre-defined criteria based upon user input processed by the communicatively coupled user interface module 240. Defining policies includes the creation of policies and the modification of policies. Examples of aspects of a policy includes specification of rules and permissions (e.g. policy override), defining one or more locations associated with network environments, defining or identifying security features to be monitored, ports to be monitored, network services to be monitored, applications to be monitored, enforcement mechanisms to be put in place for a particular policy, level identification for a policy or policy aspect for flexibility (optional, recommended, mandatory, invisible), and feedback (e.g. custom error messages) to alert an administrator via a user interface screen using the server system 200 of certain conditions or to alert a client device user via a user interface screen of certain conditions.

There may be several layers of policies. For instance, there may be a base policy applicable to a group of entities. Examples of entities may be users or the mobile devices themselves. In these examples, the group may include one instance of an entity. The attributes of the base policy may be incorporated into other policies which add on additional attributes. For example, a base policy for a group including engineers in a user interface design department may allow access to files on a certain disk drive. Another policy based on location that incorporates the attributes of the base policy may, on the other hand, only allow access to encrypted versions of files if a mobile device through which a UI design engineer is logged in is operating in a "Home" network location. Of course, other examples are readily imagined by skilled artisans.

In other embodiments, the policy management module 236 is provided with an enterprise's existing group structures and the policy management module compensates for a failing in the traditional makeup of groups. That is, since groups are not hierarchical, it is common for one person to be a member of several groups. To the extent each group has its own security policy, an issue can arise as to how to determine which policy to apply to a particular user. Thus, the policy management module 236 inputs a prioritized list of groups from a memory location 242. The policy management module then searches the groups in priority order of the list. In the event a person is a member of "engineering" and "executive staff," that person will get the security policy for whichever of those two groups comes first in the prioritized list. Alternatively, in the event a user is not a member of any group, there is provided a default policy on the prioritized list.

Connected to the policy management module is the policy distribution module 234. Its function is to distribute security information to the one or more client mobile devices 201. Examples of security information are versions of existing policies, updated policies, software, or the like.

Connected to the policy management module is the authorization module 232. It functions to authorize a communication exchange between the client mobile device and the policy distribution or policy management modules. (Which, representatively, will be seen during the pre-boot phase of operation.) Primarily, it is a further safeguard against unauthorized or rogue mobile devices trying to hijack the security policies or corporate data of the endpoint device. In this regard, various authorization protocols and techniques may be used. One example is a simple username and password verification scheme. Another example is a cryptographic authentication protocol. The authorization module 232 may also be used to authorize a communication exchange between the client system 201 and the remote diagnostics module 224.

In the remote diagnostics module 224, concern is concentrated on the security or protection of data accessible by mobile client devices. However, the remote diagnostics module 224 may also function to provide diagnostic support for computer problems generally encountered by mobile client devices independently of security related software. In this embodiment, the remote diagnostics module 224 provides diagnostic assistance and/or corrective instructions with respect to problems not only associated with security but also provides such support with other problems generally encountered by mobile client devices. To accomplish this, the remote diagnostics module 224 has a communication interface with each of the user interface module 240, the authorization module 232, the policy management module 236 and the policy distribution module 234. Ultimately, this allows a person using the mobile device to get the device repaired where they are as opposed to having to mail the device or wait until he or she is back in the office ("work" location 106) to get help.

Also, the remote diagnostics module 224 comprises three sub-modules: a monitoring module 226, a diagnosis module 228, and a diagnosis distribution module 230. The monitoring module 226 receives diagnostic information such as events or audit logs from a client device and stores the information in a data object (242) for the client device. In one embodiment, a client diagnostics module (e.g. FIG. 2B, 246) periodically and automatically initiates tests (as part of the pre-boot or at other times). Results including errors from these tests are reported over a network 204 (e.g. Internet) to the remote diagnostics module 224. Other examples of diagnostic information retrieved from the client are debug output files, examples of which include system event logs, crash dumps, and diagnostic outputs from a client diagnostics module (e.g. 246, FIG. 2B). This information may be received periodically over a network 204 from the client diagnostics module 246, or upon an initial network connection by the mobile device with the server, because the client diagnostics module 246 requests diagnostic assistance, or at other times.

The diagnosis module 228 analyzes diagnostic information stored for the mobile device. For example, the diagnosis module 228 may perform analysis according to pre-stored diagnostic programs, according to an interactive user environment, a combination of the two, or other. The diagnosis module 228 may actually provide a repair to a problem in the client device, determine that a trend is occurring for the device, or determine that preventive maintenance is to be scheduled for the client device. In one example, the diagnosis module 228 initiates requests to the client mobile device for additional information. The additional information may be based on input received via the user interface module 240 or according to a pre-stored diagnosis method. In one embodiment, the diagnosis module 228 provides requested information to the user interface module 240 responsive to user input. In another embodiment, the diagnosis module 228 may provide requested information transmitted via the diagnostics distribution module 230 over the network 204 to the client mobile device responsive to requests received at a user interface module on the client device (e.g. FIG. 2B, 218).

In any event, once a diagnosis has been made with respect to a problem, support information may be distributed to the mobile device under the control of the diagnosis distribution module 230. As contemplated, "support information" may be in the form of instructions or code to the client device to repair a problem or perform maintenance. This provides an advantage of taking corrective or preventive actions without requiring user intervention or action. In another form, "support information" may be forwarded as messages for display by the client device in providing a diagnostic report or requesting specific input from a user of the device. Naturally, either or both of the monitoring module 226 or the diagnosis module 228 may initiate tests and/or queries to determine the readiness or robustness of the existing client device population. Trends may be noted. Again, these tests may be run during a connection with a device without requiring user intervention.

In still other embodiments, the remote diagnostics module 224 may also probe a particular client to verify its status. For example, client configuration information may be retrieved such as the current version of the security policy software components on the client device, the current policy settings on the device, and attributes in accordance with those settings, for example, which ports are blocked. This information may be stored for later assistance in a diagnostics situation or for use with a current diagnostics situation.

With reference to FIG. 2B, the client 201 includes a location detection module 208, a policy setting module 212, security features determination module 210, a policy enforcement control module 214, a layer manager 206, a user interface module 218, particular memory location(s) 216 in an otherwise attendant memory 220 (ROM, RAM, etc.), an authorization module 245, a client diagnostics module 246, and access to remote or local storage 247, e.g., disk.

In more detail, the authorization module 245 is configured to provide authorization information to the authorization module 232 of the server system 200 to establish communication exchanges with the client mobile device for the exchange of security information or diagnostic information or both. The client diagnostics module 246, on the other hand, collects diagnostic information which is sent to the remote diagnostics module 224 of the server system embodiment 200.

In the layer manager 206, a communications interface is established to one or more of the other modules 208, 210, 212, 214, 245, 246. In function, the layer manager processes network traffic which may include inbound data (e.g. from 242, FIG. 2A) accessible over a network and outbound copies of data objects from resident memory 220. In this embodiment, the layer manager 206 processes information in one or more layers of a model for communications between computers in a network. An example of such a model is the Open Systems Interconnection (OSI) data communications model. As is known, the OSI includes seven layers arranged as: the physical layer, the data-link layer, the network layer, the transport layer, the session layer, the presentation layer, and the application layer. Of course, another example of a model is the layered Internet Protocol stack. In this regard, skilled artisans understand four layers to be arranged as the subnetwork layer, the Internet layer, the transport layer, and the application layer.

In either, if the layer manager 206 forwards network parameters to the location detection module 208, the location detection module detects or determines the location (e.g., 102, 104, 106, 108, FIG. 1) associated with the current network environment. As a function of the predetermined computing policy for the endpoint from the server system 200, the policy setting module 212 receives, installs and updates security or other information, based on the location. Such may be found as indicators in memory locations 216 read by the policy setting module 212. Alternatively, they may include security policies and/or software updates received from the policy management module 236 via the policy distribution module 234 over the network connection 204. In addition, the policy setting module 212 may define criteria or, if permissions set by the policy management module 236 allow, supplemental policy definitions or customization of policy definitions based upon user input processed by the mobile device user interface module 218. Similarly, if operating in a standalone mode not under the control of the server system, the policy setting module 212 defines an aspect of a policy such as location criteria or security features criteria based upon user input processed by user interface module 218. The policy setting module 212 may also undertake these events periodically, randomly, and/or responsive to a notification message from another module, such as the location detection module 208.

In an alternate embodiment, an optional policy setting module 238 may operate on a server computer system such as the one illustrated in FIG. 2A that determines the selection of the current security policy for the mobile device based on criteria information received from the mobile device including location and activity status of one or more security features or based on network parameters forwarded by the layer manager 206. In this embodiment, a module on the client device such as the policy enforcement control module 214 receives commands from the policy setting module 238 and executes them on the mobile device.

Alternatively still, a user can direct the policy by way of a user interface module 218. As is typical, the user interface module 218 receives input from a user input device such as a keyboard, mouse or touch pad.

In other aspects, a security feature module 210 determines whether one or more security features have an activity status of inactive or active in a communication session between the mobile device and another computer. An example of this is determining whether a connection type to the other computer is wired or wireless. Simply enough, this can be indicated by associating the port over which data is being communicated, e.g., a wireless adapter, a network interface card (NIC), etc. In another example, further details of the connection may be indicated by subdivision into further distinctions (e.g. wireless: 802.11, GPRS, GSM, 3G, etc., or wired: modem, digital subscriber line (DSL), T1 line, etc). In other embodiments, policies may be set based on these items. For example, a different security policy may be applied for different vendor brands of NICs or particular classes (e.g. 802.3, 802.11a, 802.11b, GPRS, GSM) of NICs. Furthermore, different security policies may be assigned based on a type of operating system (Unix, Linux, Windows, Leopard, etc.) employed or the version (e.g., 3.1, 3.2, 3.3) of the operating system because different systems or versions provide different security features. Furthermore, different policies may be employed based on the security features (e.g. a firewall) provided by different types of network access points (NAP). Additionally, the presence or absence of upgraded NIC support for enhanced security protocols (e.g. 802.11i), or the presence or absence of security software such as virtual private network (VPN), or anti-virus software, or intrusion-detection software may be the basis for setting different policies on a particular port, network adapter or data.

Figure 3:
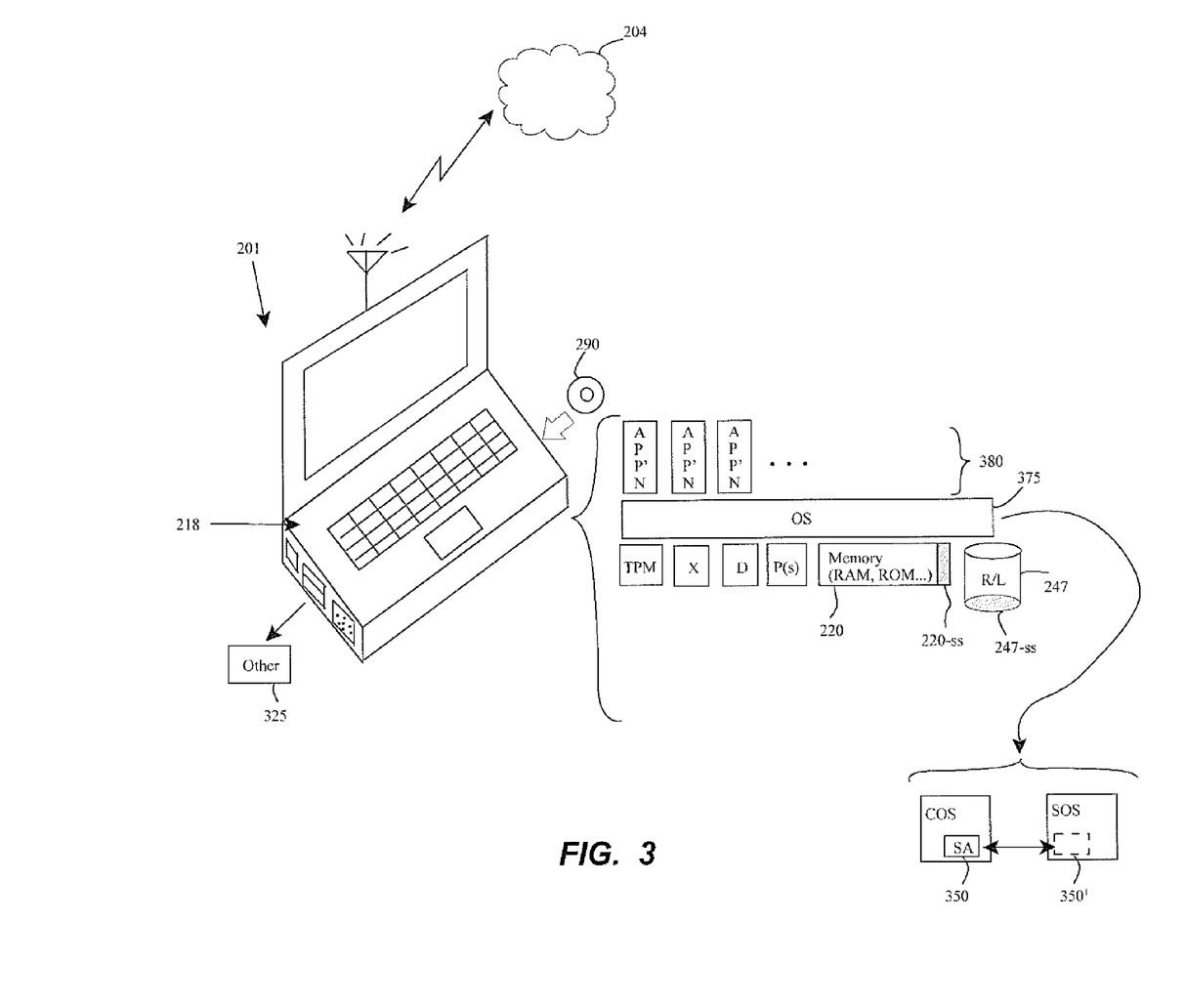
FIG. 3 is a diagrammatic view in accordance with the present invention of a representative endpoint asset in the form of a laptop computing device including a pre-boot operating system.

Leveraging the foregoing, FIG. 3 begins the detailed illustration of the mechanics for actually protecting the encrypted data of the endpoint computing asset (e.g., 201) by way of managing decryption keys. Preliminarily, however, further tangible items exist on the computing asset 201, in addition to the modules described in FIG. 2B, such as a hardware platform upon which the firmware, operating system 375 and computing applications 380 are found. As is typical, the hardware platform embodies physical I/O and platform devices, memory (M) 240 (RAM, ROM, etc.), one or more processor(s) (P), such as a CPU, drivers (D), trusted platform module (TPM) chip(s), and interfaces (X) to internal or other items 325, and access to remote or local disk storage 247.

Also, the memory and/or storage may have a shared portion 220-SS (SS: shared store), 247-SS, that both the traditional operating system (COS: for computing operating system) and pre-boot operating system (SOS: for secure operating system) can access, such as by writing to and reading from. Either or both of the traditional and pre-boot operating systems can also include an embedded agent (security agent (SA) 350, 350') for communicating/handing-off information from one operating system to another during use. In turn, various sub-agents, not shown, may be utilized for detailed aspects of the communication. With reference to U.S. published patent application no. 2010/0153696, published on Jun. 17, 2010 and entitled "Pre-Boot Securing of Operating System for Endpoint Evaluation," a more detailed discussion of one example of a pre-boot phase of operation is given as is its capabilities. In that the inventors hereof are the same as the earlier filed application and Novell, Inc., is the common Assignee of both inventions, the earlier '466 application is incorporated herein in its entirety as if set forth entirely herein.

In other embodiments, the pre-boot operating system could be implemented in conjunction with Full Disk Encryption companies (such as Secude) wherein expanded BIOS actions on some computing devices, Hardware Base Encryption Interface implementations, or general networking protocols, are arranged independently of the "end" or more traditional operating system. The Intel corporation has also released VPro and VT technologies into their chipsets and motherboards that this could be applied to as well. Further, it is believed that Altiris/Symantec have worked with Intel on creating a proprietary version of a pre-boot operating system that may work here too.

Figure 4:
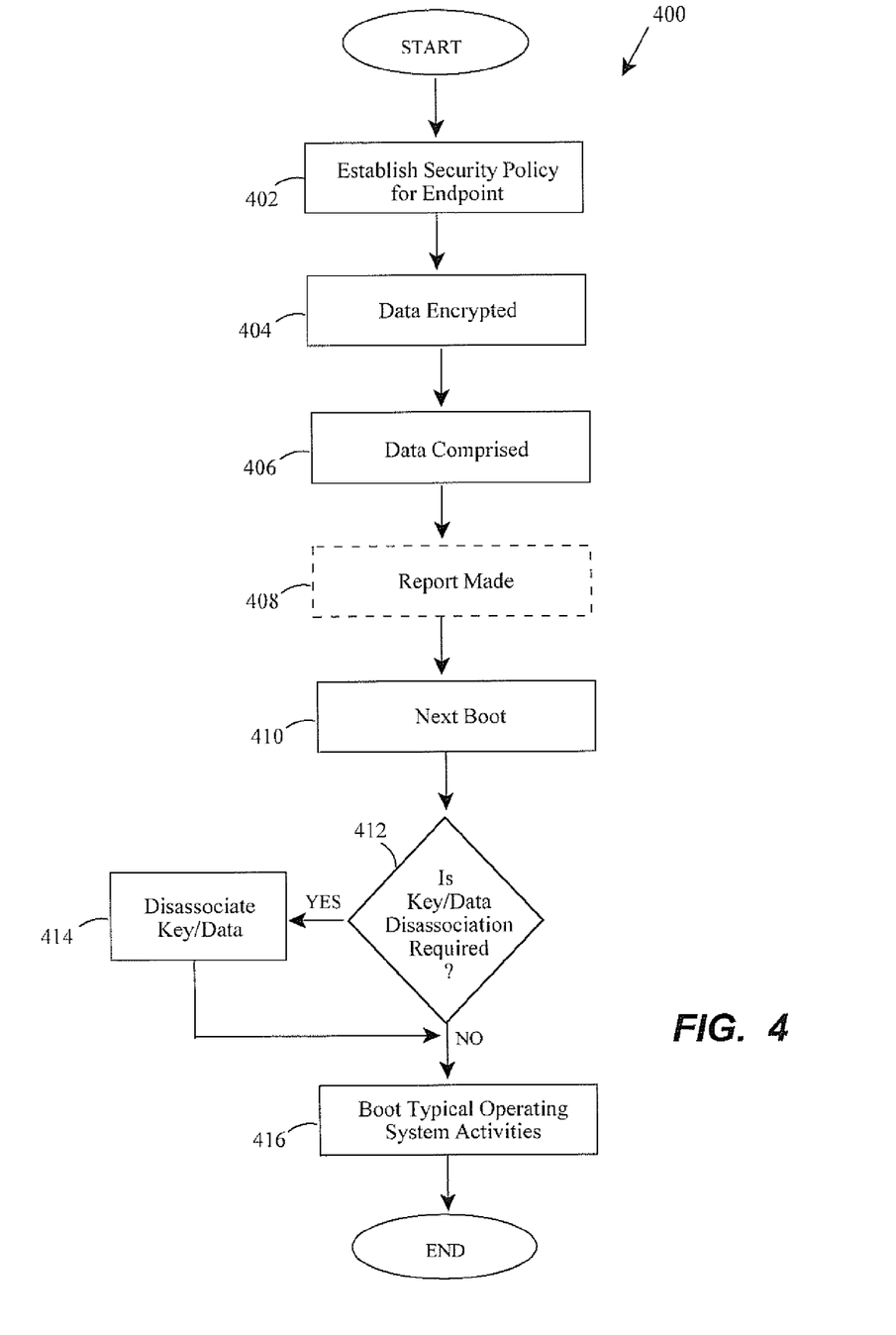
FIG. 4 is a flow chart in accordance with the present invention for protecting encrypted data of endpoints by managing decryption keys.

With reference to FIG. 4, a representative method of protecting encrypted data of an endpoint computing device is given generally as 400. In a first step, 402, a computing policy is established for security of the endpoint computing device. As before (e.g. FIG. 2B), this can be based on a variety of criteria, such as a location of the device during use, a connection type, a hardware type of a port and its inherent security settings, an activity status, user input, firewall settings, VPN enforcement, patching applications, device quarantining, (dis)allowing data or executable instructions from removable media or networks, user identity/group, etc. It can also be set and developed per endpoints acting independently, can be foisted upon the endpoint asset from an upstream host (FIG. 2A), can be set by a user, etc. It can also be updated over time. (Again, FIGS. 2A and 2B describe various policy setting modules where these activities can take place as well as the policy enforcement modules that undertake the necessary command and control to instruct other modules, structures, etc., to carry out the policies.)

Once set, however, each endpoint asset will eventually have data thereon encrypted, step 404. In a traditional sense, this can be in the limited form of encrypted files, folders, applications, etc., or the more pervasive form of a partial or full disk encryption (FDE). Also, the encrypted data will have a key to decrypt it in order to decipher the contents of the encryption. During use, the key may be created at the time of data encryption or at other times. It can be created in a public/private key paradigm or with entirely private keys. Also, the key will be stored at some location on the endpoint computing device for later retrieval in times of decryption. In the situation of FDE, it is entirely common to store the key with the TPM (FIG. 3), with flash memory or support memory for where keys are stored for crypto-ASICs. In other situations, however, the key can reside anywhere. The location of key may also be encrypted, in turn, having other keys that first find the whereabouts of the key before the found key can decrypt the data. Of course, other scenarios are possible.

At step 406, it is assumed that some manner of compromise has occurred with respect to the data. In this regard, the endpoint computing device may have been lost, misplaced, stolen, etc. Alternatively, the device's whereabouts may be known but suspected viruses, hacks or other attacks on the device appear to leave it vulnerable to theft of data or potential breaches. (The Client Diagnostic Module 246, FIG. 2, may be useful in this regard. For instance, the module may find known viruses on the computing device by comparison to promulgated signatures thereof.) Alternatively still, it may be the situation that the device's whereabouts are known and no manifestations of attacks have materialized, but the data itself is considered too sensitive (either by the user and/or the established computing policy) that it is deemed by setting or input that a compromise has occurred, although none may have actually occurred. (For this, the Client Diagnostic Module 246, FIG. 2, may be further useful. For instance, the module may recognize that a current anti-virus (AV) definition version is too old for the current AV policy. In turn, the policy may deem that a compromise has occurred if any data manipulation (e.g., reading, writing, etc.) occurred with the old version, even though no known compromise has actually occurred.)

Under any circumstances of actual or deemed compromise, optional step 408 (dashed lines) contemplates that a user makes a report. This may be as simple as telling a system administrator of the enterprise that a laptop's whereabouts cannot be confirmed. On the other hand, it may be as sophisticated and complex as generating electronic reports, entering logging events, tracing the laptop's whereabout with GPS, and (in)formally notifying various people, agencies, etc. about the breach. Hybrids of the foregoing reporting are also contemplated as are other events not described.

At step 410, it is assumed that a subsequent boot of the endpoint computing device takes place (To the extent a subsequent boot never takes places, such as in the context of a lost computer that nobody ever finds or a mechanically destroyed computer that a criminal smashes apart, etc., skilled artisans will recognize that the encrypted data remains protected for want of anyone ever trying to access it.) At such subsequent boot, step 410, the pre-boot operating system loads and provides the endpoint with limited computing opportunities sufficient to undertake the following step. Namely, the endpoint is provided with just enough processing capabilities and network interaction with other computing devices to determine whether the encrypted data and key require a disassociation from one another, step 412. Examples of this usefulness will be seen below in the following examples. However, certain embodiments contemplate a limited computing connection between the endpoint and a specified authentication server and/or approved networking ports, USB devices and biometric equipment.

If no, at step 416, the traditional operating system and typical operations of the computing device are booted, e.g., computing applications for word processing, internet browsers, email, etc. If yes, the disassociation between key and data occurs, step 414. Disassociation can occur in a variety of ways including, but not limited to, deleting an entire existence of the key and/or data, or scrambling the key and/or data until it is no longer decipherable with the original key. To the extent the whereabouts of the key are known, such as in a TPM, the key can be straightway disassociated. To the extent its whereabouts are unknown, the key may first need to be located. Updating of keys can also occur as can re-encrypting the encrypted data with a new key. Re-associating otherwise disassociated keys and data may occur upon finding a mistake or lack of compromise in the encrypted data.

In more detail, the following prospective, non-limiting examples provide illustration of the methodology of FIG. 4.

Example 1

1) The endpoint computing device is stolen by a thief.
2) The established computing policy for stolen devices is to entirely destroy decryption keys.
3) Upon a subsequent boot, a pre-boot phase of operation is launched that limits computing functionality on the endpoint.
A) This prevents a user of the endpoint from accessing the encrypted data and the key. B) This only allows the endpoint 200 to communicate back to a networked central server 200.
4) The endpoint attempts authentication with the central server
5) The authentication fails because the present user of the endpoint is the thief or another party having downstream privity with the thief (e.g., a purchaser of the stolen endpoint).
6) The server instructs the policy enforcement module 214 to destroy all decryption keys. Alternatively, the server points to a specific policy stored on the endpoint which, when read, instructs the destruction of the decryption keys.
7) The key in the TPM (FIG. 3), or elsewhere, is located and destroyed by deleting. No means now exist on the endpoint for deciphering the encrypted data. The encrypted data is protected.

Example 2

This example contemplates a policy that controls/enforces means of credential validation during a Full Disk Encryption pass during a bootup sequence.

1) A security policy requires three factors of authentication related to an approved biometric device, user credential protocol exchange, and/or some USB token or certificate.
2) During a bootup sequence of the endpoint, the pre-boot OS locks down computing connections between the endpoint to only those interconnected USB devices with approved criteria (determined by policy settings such as known device serial numbers, make/model information, etc.) as well as specified/approved biometric devices (again policy based enforcement of aspects of the biometric device). The lock down also escrows the key from accessing the encrypted data.
3) By the pre-boot operating system, applying a policy-based firewall to protect user credential and/or authentication protocols to policy specified authentication servers, e.g., 200, or approved (policy controlled) networking ports of the endpoint.
4) If all three factors of authentication pass, boot traditional endpoint computing activities including releasing the key to decrypt the encrypted data. Otherwise, disassociate key from the data. As skilled artisans will understand, all aspects of the three factor authentication could not only be enforced from a well known cryptography validation stand point, but also have the added measure of controlled data input through hardware lock down (e.g., USB) and network protocol enforcement (e.g., ports) in the PBOS.

Example 3

This example is the same as Example 2 related to key escrow, but could build on it with key updating and/or key backup operations.

Undertake, the same steps as above, but the final operation is not decryption of the encrypted data, but rather the following key options: Namely, upon administration of two or three factor authentication validation, the endpoint uses APIs exposed into either the Trusted Platform Module or cryptography-ASIC to:

1) Update the encryption keys on the hard disk.
2) Backup the existing keys for data recovery.
3) Erase the original key (ultimate security to render the data useless).
4) Update subsequent Pre-Boot Authentication policies Naturally, many more examples can be imagined by the artisan of ordinary skill in the art and a near endless variety of examples can occur. Also, any of the foregoing embodiments contemplate that the operating system 375 (FIG. 3) and applications 380 could be any of many individual domains in a virtual computing environment. That is, the operating system shown could be a host or guest operating system, (e.g., Linux, Windows, Netware, Unix, etc.), each with its own applications, file systems, etc. An intervening hypervisor layer (not shown), also known as a "virtual machine monitor," or virtualization manager, would exist to interface the domains to the hardware. As is known, the hypervisor is the lowest and most privileged layer and performs scheduling control between the virtual machines as they task the resources of the hardware platform, storage 247, memory (M), etc. The hypervisor also manages conflicts, among other things, caused by operating system access to privileged machine instructions. According to various partitions, the application data, boot data, or other data, executable instructions, etc., of the machines would be virtually stored on the available memory and storage. Also, each domain would have its dedicated, traditional operating system (COS), including a pre-boot operating system (SOS) that could be dedicated to each domain or common to the entirety of domains. Of course, skilled artisans can readily configure the virtual environment.

In any embodiment, skilled artisans will appreciate that enterprises can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks 290 (FIG. 3) for insertion in a drive of computing device, or available as downloads or direct use from processor firmware, memory or storage of an upstream computing device. When described in the context of such computer program products, it is denoted that executable instructions thereof, such as those in components, modules, routines, programs, objects, data structures, etc., perform particular tasks or implement particular abstract data types within various structures of the computing system which cause a certain function or group of function, and enable the configuration of the foregoing.

Certain advantages over the prior art should now also be easily recognized. For instance, the foregoing provides (among other things): leveraging the Pre-Boot operating system to interface with a TPM to control FDE; use of some layer 2/layer 3 networking protocol, to interface with the TPM to control the FEDE; expanding the interface to Hardware Based Encryption Disks to allow for network information exchange to control data encryption/decryption; and policy based control over the means of encryption key validation, update, and general key escrow.

Although the foregoing has been described in terms of specific embodiments, one of ordinary skill in the art will recognize that additional embodiments are possible without departing from the teachings of the present invention. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of other figures. Other modifications include combining the functionality of one or more modules into still other modules having the same functionality. In other words, skilled artisans will understand that the function of the discretely shown modules may be accomplished by lesser or more modules in practice, or modules having different names/identifiers.

The invention claimed is:

1. In a computing system environment, a method of protecting encrypted data of an endpoint computing device, the encrypted data able to be decrypted with a key located at the endpoint computing device, comprising:
   determining according to an enterprise computing policy whether the endpoint computing device has been compromised;
   upon a subsequent booting of the endpoint computing device, launching a pre-boot phase of operation during which time a pre-boot operating system prevents a user of the endpoint computing device from accessing the encrypted data and the key and enforces a limited computing capability of the endpoint computing device sufficient to determine whether the encrypted data has been compromised and whether the key requires disassociation from the encrypted data;
   determining according to the enterprise computing policy whether the key requires disassociation from the encrypted data; and
   if so, disassociating the key.

2. The method of claim 1, wherein the disassociating the key further includes deleting an existence of the key from the endpoint computing device.

3. The method of claim 1, wherein the determining whether the key requires disassociation from the encrypted data includes authenticating the endpoint computing device back to a networked server in the computing system environment.

4. The method of claim 1, further including updating a security policy of the endpoint computing device per the enterprise computing policy.

5. The method of claim 1, deploying a new key to the endpoint computing device and re-encrypting the compromised encrypted data with said new key.

6. The method of claim 1, further including re-associating the disassociated key with the encrypted data at the endpoint computing device in the event the encrypted data was not compromised and the key was disassociated.

7. In a computing system environment, a method of protecting encrypted data of an endpoint computing device, the encrypted data saved in memory and or disk of the endpoint and able to be decrypted with a key located in a trusted platform module at the endpoint computing device, comprising:
   upon a booting of the endpoint computing device, launching a pre-boot phase of operation during which time a pre-boot operating system prevents a user of the endpoint computing device from accessing the encrypted data and the key and enforces a limited computing capability of the endpoint computing device sufficient to determine whether the key requires disassociation from the encrypted data;
   determining according to an enterprise computing policy whether the encrypted data has been compromised and whether the key requires disassociation from the encrypted data;
   if so, locating the key in the trusted platform module; and
   deleting an existence of the key from the trusted platform module.

8. The method of claim 7, further including pushing a security policy per the enterprise computing policy to the endpoint computing device from a networked computing device in the computing system environment, the security policy instructing the endpoint computing device to delete the existence of the key.

9. The method of claim 7, further including pushing a security policy per the enterprise computing policy to the endpoint computing device from a networked computing device in the computing system environment, the security policy requiring the endpoint computing device to have three factors of authentication before accessing the encrypted data.

10. In a computing system environment, a method of protecting encrypted data of an endpoint computing device, the encrypted data saved in memory and or disk of the endpoint and able to be decrypted with a key located at the endpoint computing device, comprising:

upon a booting of the endpoint computing device, launching a pre-boot phase of operation during which time a pre-boot operating system prevents a user of the endpoint computing device from accessing the encrypted data and the key and enforces a limited computing connection between the endpoint computing device and one of a specified authentication server networked to the endpoint computing device in the computing system environment, approved networking ports of the endpoint computing device, approved Universal Serial Bus (USB) devices connected to the endpoint computing device, and approved biometric devices, the pre-boot phase of operation further including, determining according to an enterprise computing policy whether the encrypted data has been compromised;

determining according to the enterprise computing policy relating to the one of the specified authentication server, the approved networking ports, the approved USB devices, and the approved biometric devices whether the key requires disassociation from the encrypted data: and if so, disassociating the key from the encrypted data.

11. The method of claim 10, wherein a predefined security policy per the enterprise computing policy identifies the limited computing connection to the endpoint computing device.

12. The method of claim 10, further including locating the key in a trusted platform module of the endpoint computing device.

13. The method of claim 10, wherein the disassociating the key from the encrypted data further includes deleting an existence of the key, deleting an existence of the encrypted data, scrambling the key, scrambling the data, or re-encrypting the encrypted data with a new key.

14. An endpoint computing device, comprising:

a hardware platform including a processor, memory and disk;

encrypted data configured for storage in the memory and or disk;

a key stored on the hardware platform to decrypt the encrypted data;

a policy enforcement module on the hardware platform to carry out predefined security policies according to enterprise computing policy between the key and the encrypted data; and a computing operating system and a pre-boot operating system configured to act on the processor such that upon launching a pre-boot phase of operation the policy enforcement module requires the pre-boot operating system to prevent a user of the endpoint computing device from accessing the encrypted data and the key, enforces a limited computing connection with at least one other computing device to determine whether the encrypted data has been compromised and whether the key requires disassociation from the encrypted data, requires a determination of whether the key requires disassociation from the encrypted data, and if so requires a disassociation of the key from the encrypted data upon a determination according to the predefined security policies that the encrypted data has been compromised.

15. The endpoint computing device of claim 14, further including a trusted platform module as part of the hardware platform to store the key.

16. The endpoint computing device of claim 14, wherein the policy enforcement module is further configured during the pre-boot phase of operation to require a limited computing connection between the endpoint computing device and one of a specified authentication server networked to the endpoint computing device in a computing system environment, approved networking ports of the endpoint computing device, approved Universal Serial Bus (USB) devices connected to the endpoint computing device, and approved biometric devices.

17. The endpoint computing device of claim 14, wherein the policy enforcement module is further configured to enforce deletion of an existence of the key, deletion of an existence of the encrypted data, scrambling the key, scrambling the encrypted data, or re-encrypting the encrypted data with a new key upon said determination that the encrypted data has been compromised.

18. A non-transitory computer program product for loading on an endpoint computing device to protect encrypted data thereof, the encrypted data configured to be saved in memory and/or disk of the endpoint computing device and able to be decrypted with a key located at the endpoint computing device, the computer program product having executable instructions that launch a pre-boot phase of operation during which time a pre-boot operating system of the endpoint computing device prevents a user of the endpoint computing device from accessing the encrypted data and the key and enforces a limited computing connection of the endpoint computing device with at least one other computing device, the executable instructions further configured to determine whether the encrypted data has been compromised and the key requires disassociation from the encrypted data, and if so, disassociate the key from the encrypted data upon a determination according to an enterprise computing policy that the encrypted data has been compromised.

19. The computer program product of claim 18, further including executable instructions that during the pre-boot phase of operation open a limited computing connection between the endpoint computing device and one of a specified authentication server networked to the endpoint computing device in a computing system environment, approved networking ports of the endpoint computing device, approved Universal Serial Bus (USB) devices connected to the endpoint computing device, and approved biometric devices.

20. The computer program product of claim 18, further including executable instructions that during the pre-boot phase of operation locate the key in a trusted platform module of the endpoint computing device and delete an existence of the key from the module upon said determination that the encrypted data has been compromised.

* * * * *